United States Patent [19]
Prete, Jr.

[11] 3,810,534
[45] May 14, 1974

[54] AUTOMATIC PALLET LOCKING DEVICE

[75] Inventor: Ernest Prete, Jr., Woodland Hills, Calif.

[73] Assignee: Ancra Corporation, El Segundo, Calif.

[22] Filed: Apr. 22, 1970

[21] Appl. No.: 30,848

[52] U.S. Cl. .............................. 193/40, 105/366 C
[51] Int. Cl. .......................................... B65g 11/00
[58] Field of Search....... 105/366 C, 369 A; 193/32, 193/35 A, 40; 214/84; 244/137; 248/361, 119 R, 119 S

[56] References Cited
UNITED STATES PATENTS

| | | | |
|---|---|---|---|
| 3,088,569 | 5/1963 | McClelland et al. | 193/35 A |
| 3,532,201 | 10/1970 | McConnell | 193/35 A |
| 1,430,766 | 10/1922 | Stebler | 198/26 X |
| 3,168,876 | 2/1965 | Clejan | 105/366 C |
| 1,966,492 | 7/1934 | Fildes | 105/366 C |
| 2,424,429 | 7/1947 | Bamberg | 248/361 |

Primary Examiner—Richard E. Aegerter
Assistant Examiner—Hadd S. Lane
Attorney, Agent, or Firm—Sokolski, McCormack & Schaap

[57] ABSTRACT

A cargo pallet locking device utilizing fully retractable locking arms which are automatically actuated by the passage of the cargo pallets over the device. Pallet position is sensed by means of a pallet pickup actuator lever, in such manner that cargo pallets may be passed over the device during the cargo loading operation without actuating the locking mechanism. As each pallet reaches its final position, it is automatically locked in place. When the final pallet is loaded, or if a pallet position is not occupied, the lock assembly is capable of manual erection with a pallet either aft or forward of the lock assembly.

5 Claims, 15 Drawing Figures

PATENTED MAY 14 1974
3,810,534
SHEET 1 OF 4
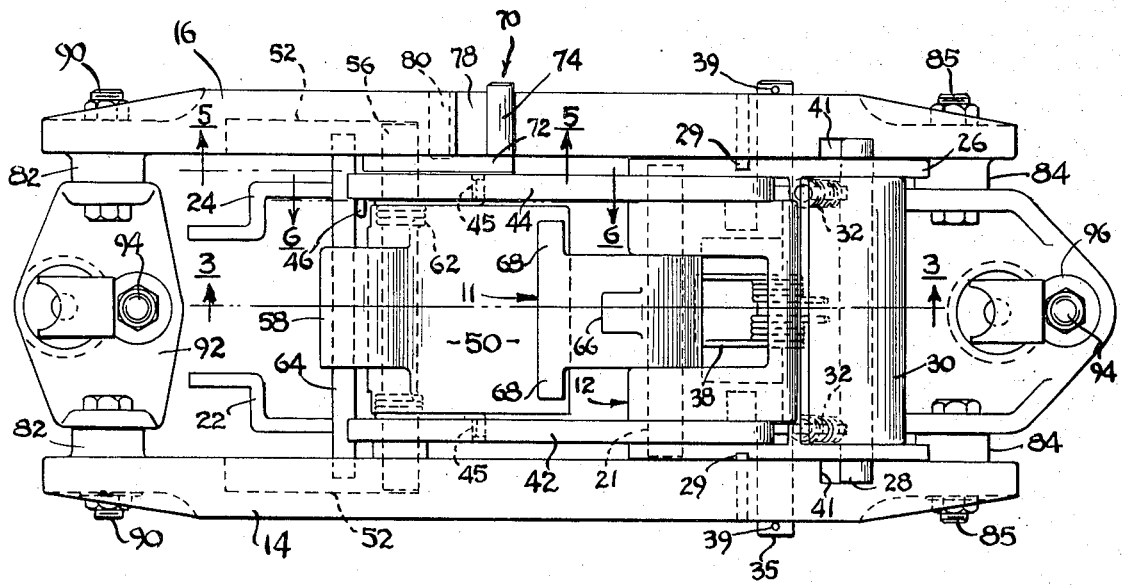
Fig. 1
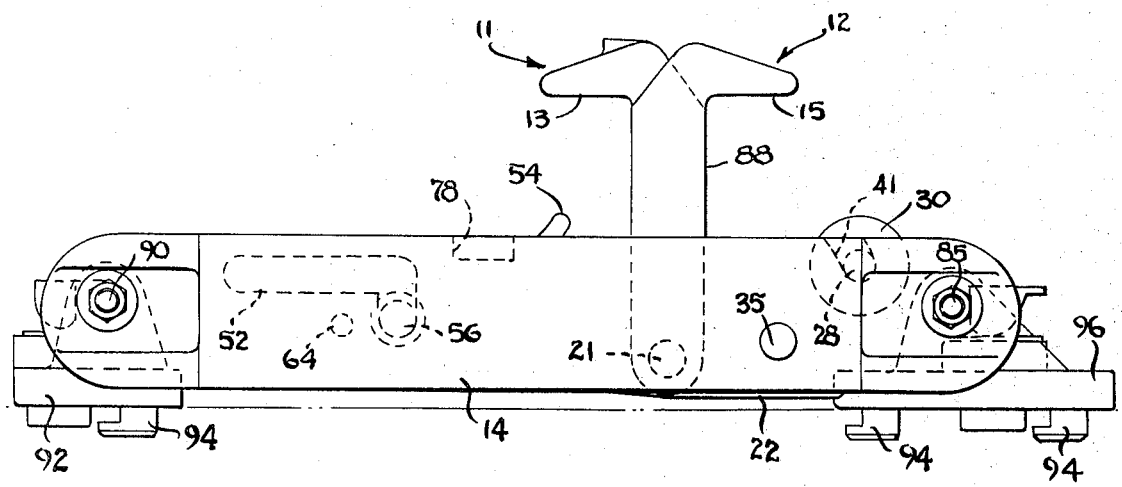
Fig. 2
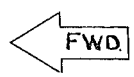
FWD
INVENTOR
ERNEST PRETE, JR.
BY
SOKOLSKI & WOHLGEMUTH
ATTORNEYS

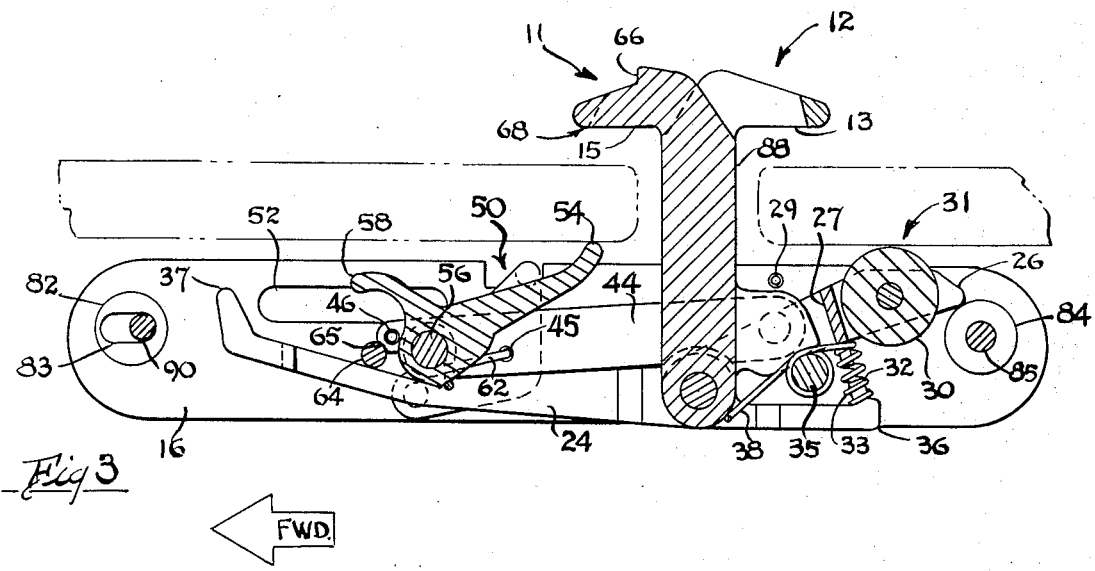

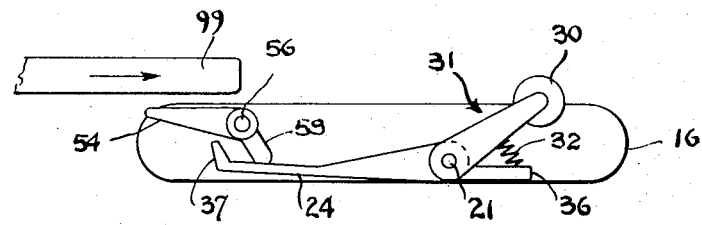
Fig. 7
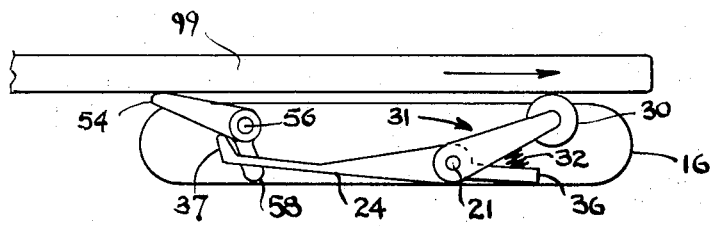
Fig. 8
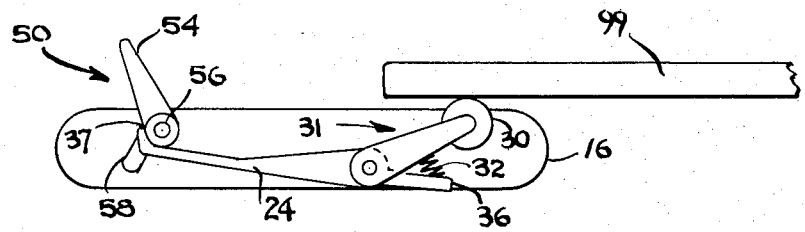
Fig. 9
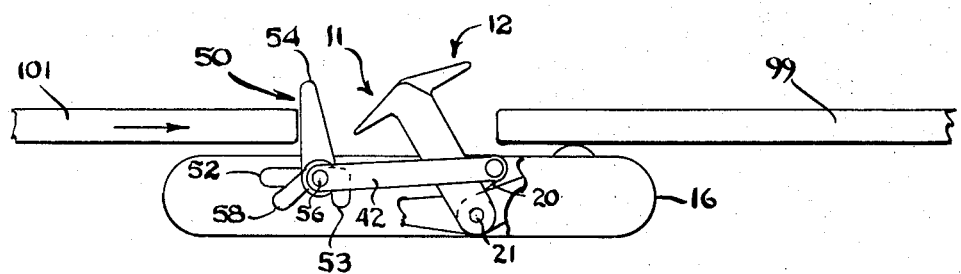

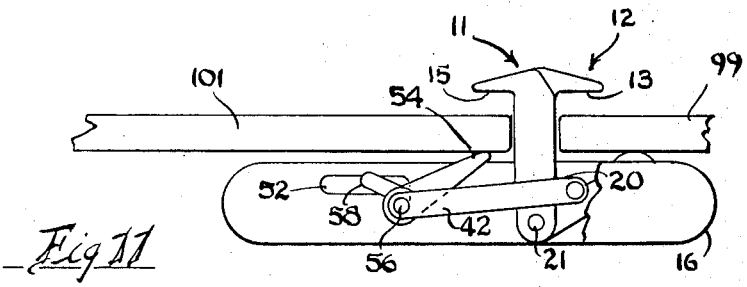
Fig. 11
INVENTOR
ERNEST PRETE, JR.
BY
SOKOLSKI & WOHLGEMUTH
ATTORNEYS

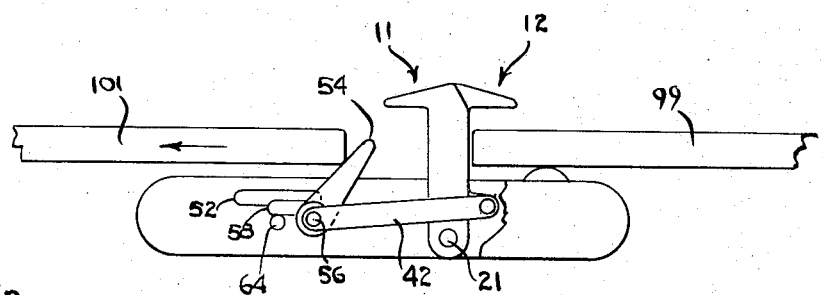
Fig. 12
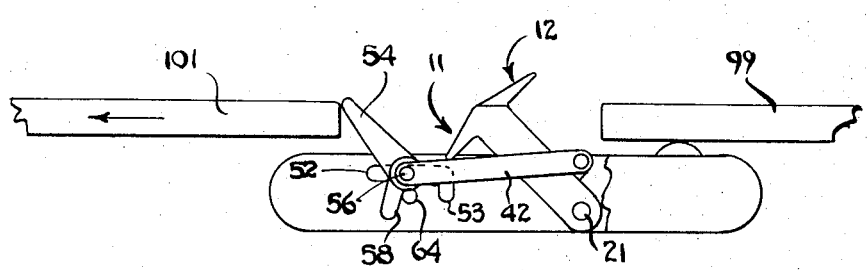
Fig. 13
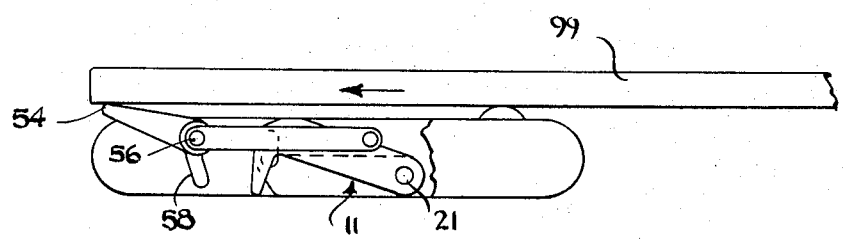
Fig. 14
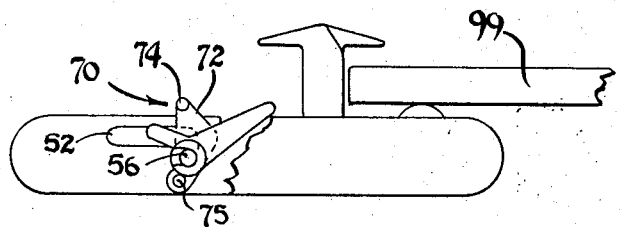
Fig. 15
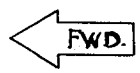

3,810,534

AUTOMATIC PALLET LOCKING DEVICE

This invention relates to a cargo securing device and more particularly to a cargo securing device which is normally positioned in a retracted condition, and automatically raises to the cargo engaging position when a cargo pallet is loaded into the aircraft, without the need of manual operation or external power source.

Cargo pallets are typically loaded aboard aircraft or other cargo carrying vehicles in rows which are parallel to the longitudinal axis of the vehicle. As each pallet is loaded, it must be secured in position so it will not move during transport. Using existing manually operated cargo securing devices, personnel must be aboard the aircarft during the loading operation to perform the final positioning and actuation of the locking devices. During the early stages of loading and final stages of unloading, due to the concentration of cargo at one end of the fuselage, the floor is likely to tip slightly, thereby causing the cargo to move by gravity unless restrained. This presents a substantial hazard to the safety of the cargo handling personnel, and creates the risk that the cargo and even the aircraft itself could be damaged. In addition, the time required for the manual positioning and actuating of the cargo securing devices delays the loading and unloading operations.

The present invention overcomes the aforementioned shortcomings by providing means for automatically securing the cargo pallets when they have reached the proper position in the vehicke.

Briefly described, this is accomplished by providing a pallet sensing mechanism so that a pallet may pass completely over and off the device without actuating the locking mechanism. However, when a pallet comes to rest with its rearward portion on the sensing mechanism, it causes the locking mechanism to become cocked, so that the next pallet to arrive triggers the locking mechanism, which erects locking arms for securing the pallets in position. Means are also provided for automatic unloading, such that the removal of the second to arrive pallet causes the locking arms to return to their retracted positions, thereby permitting the removal of the first arriving pallet. A special safety feature is inherent in the invention, in that means are provided for preventing the accidental sliding of pallets, should the floor become tipped during unloading. By utilizing this invention, it is possible to accomplish the loading and unloading of cargo vehicles without the necessity of manually securing the pallets in position, and without the risk of injury to personnel, cargo or the aircraft due to accidental cargo sliding.

It is therefore a principal object of this invention to provide a cargo securing device capable of automatic operation, which may be mounted on the floor of a cargo vehicle, and which will remain in the retracted position until pallets are placed upon the device in such a manner so as to cause its automatic actuation.

It is further an object of this invention to provide such a cargo securing device which is capable of automatically permitting the unloading of pallets without the necessity of manual operation.

Other objects of this invention will become apparent from the following description taken in connection with the accompanying drawings, of which:

FIG. 1 is a top plan view of a preferred embodiment of the pallet locking device of the invention.

FIG. 2 is a side elevational view of the preferred embodiment of the invention in the locked position.

FIG. 3 is a sectional view of the preferred embodiment of the invention taken along the plane indicated by 3—3 in FIG. 1.

FIG. 4 is a partially sectioned side elevation view illustrating the preferred embodiment in a retracted position.

FIG. 5 is a partially sectioned view of the manual locking lever taken along the plane indicated by 5—5 in FIG. 1.

FIG. 6 is a partially sectioned view showing the pallet pickup actuator lever taken along a plane indicated by 6—6 in FIG. 1.

FIGS. 7–11 are a series of schematic views of the preferred embodiment of the invention sequentially illustrating the loading of pallets thereon.

FIGS. 12–14 are a seris of schematic views of the preferred embodiment of the invention sequentially illustrating the unloading thereof.

FIG. 15 is a schematic view of the preferred embodiment of the invention illustrating the manual locking lever.

Figure 10:

Referring to FIGS. 1–3, a forward locking arm 11 and aft locking arm 12 are shown in the erected position. The locking arms are pivotally supported at their root ends between base plates 14 and 16 on a shaft or hinge pin 21. The locking arms and hinge pin may be formed of a corrosion resistant material having high impact strength such as stainless steel. Located on either side of the locking arms and also pivotally mounted on pin 21 are sensor bars 22 and 24, formed of a suitable high strength sheet material and having upward extending fingers 37 formed on the forward ends thereof. Also supported on pin 21 is an H-shaped roller support bracket 26, the lower arms of which are pivotally mounted at the extremities of pin 21 in such a manner as to straddle the sensor bars and locking arms. At the other end of the roller support bracket, a shaft or roller pin 28 extends between the two bracket arms and passes through the thickness of the arms so as to extend beyond the outer surface of the arms on either side. A roller 30 is press fit onto the roller pin 28 and extends between the inner surfaces of the roller support bracket arms.

The roller support bracket 26, roller pin 28 and roller 30, which will be generally designated as the roller assembly 31, is free to pivot about the hinge pin 21. The downward motion of the roller assembly 31 is restrained by shaft or bumper pin 35 which is parallel to the hinge pin 21 and roller pin 28 and passes through the thickness of the base plates 14 and 16 so as to extend beyond the outer surfaces thereof. Spring pins 39 are provided on either side of the base plates to prevent sideways motion of the bumper pin 35. Downward motion of roller assembly 31 is also limited by arcuate slots 41, recessed into the inner surfaces of base plates 14 and 16, into which the ends of roller pin 28 fit when the roller assembly is pressed downward.

Mounted on shaft 35 is a torsional resilient means or spring 38 having one end in contact with the bottom surface of the forward locking arm 11 and the other end in contact with the bottom surface of cross bar 27 of the roller support bracket 26. The spring 38 provides an upward bias to the roller assembly 31, the upward movement of which is restrained by pins 29 which protrude from the inside surfaces of the base plates 14 and 16.

As shown in FIGS. 3 and 4, downward motion of the roller assembly is communicated to the sensor bars 22 and 24 by means of helical compression springs 32 which are held in place by projections 33 provided at the aft ends of the snesor bars, and projections 34 on the underneath side of the roller support bracket 26.

L-shaped slots 52 are machined partially through the thickness of each of the base plate memers 14 and 16 near the forward ends thereof. The actuator lever assembly is generally designated 50 and comprises a pallet pickup actuator lever 54 having an arcuate tongue 58 and locking shaft 56 upon which the lever is fixedly mounted at its root end. The ends of shaft 56 are slidably located in slots 52 so that the axis of the shaft is parallel with the axis of hinge pin 21. Pivotally mounted on shaft 56 on either side of the actuator lever assembly are actuator links 42 and 44. Also mounted on shaft 56 is a torsional resilient means, or spring 62 having its ends inserted in holes 45 provided in actuator links 42 and 44. Spring 62 urges the actuator lever assembly 50 to rotate in a counter-clockwise direction. The rotation of the lever assembly is limited by a spring pin 46 which protrudes from the inside surface of actuator link 44 near its forward end. As shown in FIG. 6, the pin 46 slidably cooperates with an arcuate slot 47 formed near the base of actuator lever 54 such that no rotation is possible past the position where pin 46 reaches the bottom of slot 47.

Referring now to FIG. 4, the forward locking arm 11 and aft locking arm 12 are shown in the retracted position. The forward locking arm 11 is provided with a pair of ears 20, each of which is formed with an arcuate surface 19 located such that the surface 19 will rest on bumper pin 35 when the locking arm is rotated to the erected position as shown in FIG. 3, thereby preventing further rotation. Aft locking arm 12 is also provided with a pair of ears 18 each of which also has an arcuate surface 17 formed thereon, such that when the aft locking arm is rotated to the upright position the arcuate surface 17 comes to rest on the locking arm bumper pin 35, thereby preventing further rotation. The aft end of the actuator links 42 and 44 are pivotally secured to the ears 18 of the aft locking arm 12 by means of actuator link pins 25 which are securely pressed into holes formed in the ears 18.

A cylindrical shaft or pin 64 is fixedly secured between holes provided therefor in the inside surfaces of base plates 14 and 16 in such manner that its axis is parallel to hinge pin 21. The forward ends of actuator links 42 and 44 are provided with arcuate reliefs which abut against the shaft 64 when the locking arms 11 and 12 are in the erected position, as shown in FIG. 3, thereby preventing lateral motion of the actuator links 42 and 44. When the locking arms are in a retracted position as shown in FIG. 4, the shaft 64 serves to prevent further downward motion of the forward locking arm 11 by engaging with the tab 66 provided on the upper surface of the aft locking arm. The forward locking arm 12 is restrained from further downward motion by the lateral projections 68, as seen in FIG. 1, which are provided on the forward locking arms.

With reference to FIG. 5, the manual locking mechanism is generally designated 70 and comprises a locking lever 72 having a cylindrical handle 74 and pivotally mounted to the inside surface of base plate 16 by means of a short shaft 75 located below and slightly aft of the pin 64. Lever 72 is formed with an arcuate slot 76 located in such manner that when the shaft 56 of the actuator lever assembly 50 is located in the bottom of the inverted L-shaped slot 52, lever 72 may be manually rotated upward in a counter-clockwise direction, causing the shaft 56 to be captured in slot 76 thereby locking said shaft in position. Base plate 16 is provided with a notch 78 within which the handle 74 of the locking mechanism 70 may rest when the mechanism is in the unlocked position. Base plate member 16 is also provided with a spring plunger detent 80 which serves to retain the locking mechanism 70 in the unlocked position.

Means for securing the automatic pallet locking device to the floor of the cargo vehicle are fitted between the base plate members 14 and 16. Raised cylindrical bosses 84 are formed on the inside surface of base plates 14 and 16 at the aft ends thereof. Each boss is provided with a hole through which a bolt 85 is passed for the purpose of securing thereto aft foot member 96. Raised cylindrical bosses 82 are formed on the inside surface of base plate members 14 and 16 at the forward ends thereof, and each boss is provided with a slotted hole 83 through which a bolt 90 is passed for the purpose of securing a forward foot member 92. The slotted holes 83 allow for small adjustments in the longitudinal position of the forward foot member.

In the operation of the device of this invention, let it first be assumed that suitable fore and aft foot members have been securely bolted to locking devices (not shown), the foot members having been secured to the floor of the cargo vehicle by suitable means such as clamps 94 at predetermined locations, such that the longitudinal distance between each locking device is slightly greater than the sum of the longitudinal dimension of a pallet plus the thickness of the vertical portion 88 of the locking arm members 11 and 12. The locking devices will ordinarily be installed in the vehicle in parallel rows, and oriented in such manner that the pallets are loaded and unloaded from the forward end of the device. In the unloaded position, all the locking devices in a given row will normally be in the retracted position with the locking arm members 11 and 12 horizontally disposed between the two base plate members 14 and 16, such that no part of said locking arms extend above the top edge of the base plates. With the device in this position the pallets may pass over the device without interferring with any part of the mechanism except the roller 30.

In describing the automatic locking operation of this invention, reference is now made to FIGS. 7–9 wherein is shown a first cargo pallet 99 being slid into position. Only one of the sensor bars (i.e., 24) and its associed linkages are shown for convenience of illustration, the other sensor bar 22 operating in unison therewith. The locking arms 11 and 12 and the actuator lever assembly 50 are in the normal or retracted position with no part of them exposed above the top surface of the base plates 14 and 16. For convenience of illustration, the locking arms and their linkages are not shown in these figures. The pallet 99 slides unimpeded across the top surface of the device until it reaches the roller 30 whereupon, as shown in FIG. 8, the weight of the pallet causes the roller assembly 31 to move downwardly, thereby compressing springs 32, which in turn urge the aft ends 36 of the sensor bars 22 and 24 downward.

Since the sensor bars are pivotally mounted on hinge pin 21, the forward ends of the sensor bars with the finger members 37 formed thereon, are caused to move upward in response to the downward motion of the aft end 36. As shown in FIG. 8, the finger members 37 are brought into contact with the under surface of actuator lever 54 causing the actuator assembly 50 to rotate in a clockwise direction against the rotary bias of the spring 62 (see FIG. 3). Actuator lever 54 rotates upwardly until it contacts the lower surface of pallet 99, whereupon it is restrained from further rotation, thereby preventing springs 32 from full expansion.

When pallet 99 has slid past the point where it continues to restrain actuator lever 54 from further rotation, as shown in FIG. 9, the actuator lever rotates to a substantially vertical position in response to the force transmitted to it by fingers 37 from springs 32, which continue to press downwardly on the aft end 36 of the sensor bars. If pallet 99 is not intended to be locked in the position shown in FIG. 9, it may be slid further aft in the vehicle, thereby releasing the downward force applied to roller 30 and allowing the roller to return to the position of FIG. 7 in response to the compression stored in springs 32 and the rotational bias supplied by spring 38 (FIG. 3). The aft end 36 of sensor bars 22 and 24 are thus allowed to move upwardly to the position shown in FIG. 7, thereby releasing the force applied by fingers 37 to the actuator lever 54, whereupon the actuator assembly 50 will rotationally return to its original position in response to the torque supplied by spring 62 (FIG. 3). The device is now fully retracted and any number of pallets may be passed over the device in like manner without actuating the locking mechanism. When pallet 99 has reached the position where it is intended to be locked, it is allowed to come to rest on the roller assembly 31, thereby maintaining the device in the cocked position as shown in FIG. 9.

Referring now to FIGS. 10 and 11, a second pallet, 101 is shown being loaded aboard the vehicle. As the edge of pallet 101 comes into contact with actuator lever 54, the actuator lever assembly 50 is pushed aft with its shaft 56 sliding in slots 52. As the actuator lever assembly 50 is moved aft, the actuator links 42 and 44 which are pivotally attached thereto push horizontally on the ears 18 (see FIG. 4) of the aft locking arm 12, thereby causing it to rotate clockwise into the erected or vertical position. As the aft locking arm 12 begins to rotate from the retracted position, it engages the ears 20 of the forward locking arm 11 and pulls the forward locking arm upwardly into the erect position.

When the actuator lever assembly 50 is pushed to the aft end of the L-shaped slot 52 and can travel no further in a longitudinal direction, the lever assembly 50 will continue to rotate in a clockwise direction in response to the push of the pallet against the torque supplied by spring 62. As pallet 101 continues to move aft, it will apply a downward force to the lever assembly 50, such that the shaft 56 thereof will move downwardly into the vertical portion 53 of the L-shaped slot 52, thereby allowing pallet 101 to ride over lever 54 locking it into position. With the lever assembly 50 locked into position the actuating links 42 and 44 serve to keep the locking arms 11 and 12 locked into the vertical position, as shown in FIG. 11. Pallets 99 and 101 are thereby prevented from sliding longitudinally, and are restrained from significant vertical motion by the locking dogs or horizontally projecting lugs 13 and 15 located at the top of the locking arms.

With reference to FIGS. 12-14, there is shown the unloading sequence wherein pallet 101 is slidably removed in the forward direction, releasing the downward force from actuator lever 54 and allowing it to rotate in a counter-clockwise direction in response to the torque supplied by spring 62. The actuator lever rotates until the tongue member 58 thereof comes into contact with pin 64, whereupon the torque supplied by spring 62 causes tongue 58 to act as a lever, which lifts the entire actuator lever assembly 50, causing shaft 56 to slide vertically upward in the vertical portion 53 of slot 52. As pallet 101 withdraws further, allowing continued rotation of actuator lever 54, the engagement of tongue 58 about pin 64 draws the actuator assembly 50 in a forward direction along slot 52. Meanwhile actuator links 42 and 44 have been pulling the locking arms down from the erected position, so that when pallet 101 is completely withdrawn the locking arms fall back to the retracted position under the influence of gravity. Once the locking arms have retracted, pallet 99 may be removed as shown in FIG. 14. As pallet 99 slides across actuator lever 54 and depresses it, the actuator lever moves downwardly against the force transmitted to it by fingers 37 from springs 32 in the manner as described in connection with FIG. 8.

In FIG. 15 I have shown the operation of the manual locking device 70, wherein pallet 99 is the last pallet to be loaded aboard the vehicle. The device may be erected manually by pulling upwardly on the aft locking arm 12, and sliding the shaft 56 downwardly into the vertical portion 53 of the inverted L-shaped slot 52. The manual lock may then be actuated by grasping handle 74 and pulling the locking lever 72 upwardly into a vertical position so that the slot 76 passes over the end of shaft 56, thereby preventing any upward motion of the shaft.

An important safety feature relating to the unloading of vehicles having a slanted floor is incorporated into this invention. Referring to FIG. 12, let it be assumed that the floor of the vehicle is sloping downwardly at the forward end, thereby creating the hazard that pallet 99 will spontaneously begin to slide as soon as the locking mechanism is retracted. Under such circumstances, pallet 99 will be resting against the locking arms and applying a horizontal force thereto in the forward direction. This forward acting horizontal force will be transmitted through actuator links 42 and 44 to shaft 56, which will thereby be forced against the forward edge of the vertical portion 53 of slot 52. The friction thereby created, prevents shaft 56 from rising out of slot 53, thus maintaining the mechanism in the locked position. The device may be unlocked by moving pallet 99 aft so that the force is removed from the locking arms and the actuator assembly 50 may lift out of the slot 53 as previously described in connection with FIG. 13.

This invention thus provides a rugged, lightweight and automatic means for rapidly and securely locking cargo pallets in a vehicle. By virtue of the automatic operation of this invention it is possible to obviate the necessity of manually positioning and locking the cargo securing devices, thereby greatly improving the speed and efficiency of loading and unloading operations and eliminating a substantial hazard to personnel saftey.

I claim:

1. An automatic pallet locking device for retaining at least two pallets comprising:
   a. base frame means;
   b. actuator and locking means slidably supported in said base frame means and including an actuator lever;
   c. sensing and drive means providing a mechanical actuation to said actuator and locking means in response to the weight of one of said pallets for bringing said actuator lever to a cocked position above said frame means in the path of the other of said pallets;
   d. pallet engaging means pivotally supported in said base frame means for movement from a retracted position within said base frame means to an erect pallet engaging position, said pallet engaging means comprising forward and aft locking arms each having a root end and a swing end, the swing end of each of said arms having a locking dog projecting normally therefrom and a shaft mounted in said base frame means for commonly supporting the root ends of said arms for pivotal motion about a fixed axis, said locking arms being rotatable about said shaft from a retracted position within the base frame means to said erect pallet engaging position; and
   e. means for interconnecting said pallet engaging means and said actuator and locking means;
   f. said actuator lever being adapted to be driven from the cocked position to a locked position by the other of said pallets while said one of said pallets is resting on said sensing and drive means, said actuator and locking means thereby driving said pallet engaging means to the erect pallet engaging position.

2. The device of claim 1 wherein said actuator and locking means comprises:
   a. A cylindrical locking shaft member disposed within said base frame both pivotally and slideably supported therein for longitudinal motion transverse to the axis to said shaft;
   b. An actuator lever member having a root end pivotally supported on said locking shaft and a free end which is rotatable from a retracted position within said base frame to a position wherein said free end protrudes above the edge of said frame, and having a tongue-like curved projection extending therefrom substantially normal to said lever member;
   c. Two actuator link members having one end thereof pivotally supported on said locking shaft on either side of said actuator lever, the other end thereof being pivotally connected to said pallet engaging means for the purpose of rotationally driving said pallet engaging means into the erect position; and
   d. Torsional spring means biasing said actuator lever relative to said actuator links so as to urge said lever to rotate on said locking shaft.

3. An automatic pallet locking device for retaining at least two pallets comprising:
   a. base frame means;
   b. actuator and locking means slidably supported in said base frame means and including an actuator lever;
   c. sensing and drive means providing a mechanical actuation to said actuator and locking means in response to the weight of one of said pallets for bringing said actuator lever to a cocked position above said frame means in the path of the other of said pallets, said sensing and drive means including pallet sensing means adapted to be driven downwardly toward said base frame menas in response to the weight of said one of said pallets and sensor bar means interconnecting said pallet sensing means and said actuator and locking means for cocking said actuator and locking means in response to the downward motion of said pallet sensing means, said pallet sensing means comprising roller means protruding above the top edge of said base frame means, spring means upwardly biasing said roller means relative to said base frame means, a hinge pin member disposed within said base frame, a roller pin member having a diameter smaller than that of said roller means and axially passing through the length of said roller means so as to extend beyond the ends thereof, an H-shaped bracket having a fixed end and a swing end, the fixed end thereof having two parallel arms pivotally mounted on said hinge pin member and the swing end thereof having two parallel arms between which are disposed said roller means and said roller pin member in such manner that the axis of said roller pin member is parallel to said hinge pin member and said roller pin member passes through the arms of the swing end of said bracket so as to extend beyond the outer surfaces thereof, said spring means biasing said bracket relative to said base frame so as to urge said bracket in an upward direction;
   d. pallet engaging means pivotally supported in said base frame means for movement from a retracted position within said base frame means to an erect pallet engaging position; and
   e. means for interconnecting said pallet engaging means and said actuator and locking means;
   f. said actuator lever being adapted to be driven from the cocked position to a locked position by the other of said pallets while said one of said pallets is resting on said sensing and drive means, said actuator and locking means thereby driving said pallet engaging means to the erect pallet engaging position.

4. The device of claim 3 wherein said base frame means comprises:
   a. Two parallel side plates each such side plate having an L-shaped slot formed in the inside surface thereof, for guiding the motion of said locking and actuator means;
   b. A shaft or bumper pin member fixedly disposed between said side plates and normal thereto for providing a mechanical stop to the motion of said pallet engaging means; and
   c. A cylindrical shaft or pin member fixedly disposed between said side plates and normal thereto for providing a fulcrum about which said locking and actuator means may lift out of the locked position.

5. The device of claim 3 additionally including manual locking means comprising:
   a. A manual locking lever pivotally attached to said base frame member and having a handle adapted for manual operation, wherein said lever is formed with an arcuate slot for engaging said actuator and locking means when said actuator and locking means is in a locked position, whereby said actuator and locking means is restrained in said locked position, and additionally including a spring plunger detent disposed within said base frame member for restraining said manual locking means in the unlocked position.

* * * * *